(12) United States Patent
Dickinson et al.

(10) Patent No.: US 6,337,711 B1
(45) Date of Patent: Jan. 8, 2002

(54) TRANSMISSION PERFORMANCE TESTING

(75) Inventors: R. V. C. Dickinson, Zionsville; Edwin L. Dickinson, Landsdale, both of PA (US)

(73) Assignee: Comsonics, Inc., Harrisonburg, VA (US)

( * ) Notice: Subject to any disclaimer, the term of this patent is extended or adjusted under 35 U.S.C. 154(b) by 0 days.

(21) Appl. No.: 09/337,319

(22) Filed: Jun. 22, 1999

(51) Int. Cl.[7] .............................................. H04N 17/00
(52) U.S. Cl. ...................... 348/192; 725/107; 348/183; 348/184
(58) Field of Search ........................ 725/107; 348/184, 348/180, 192, 193, 478, 183

(56) References Cited

U.S. PATENT DOCUMENTS

| | | | |
|---|---|---|---|
| 2,733,433 A | 1/1956 | Morrison | 340/351 |
| 3,750,022 A | 7/1973 | Curry et al. | 325/53 |
| 4,408,226 A * | 10/1983 | Dean et al. | 358/139 |
| 4,408,227 A * | 10/1983 | Bradley | 358/139 |
| 4,520,508 A | 5/1985 | Reichert, Jr. | 455/4 |
| 4,700,222 A | 10/1987 | Large et al. | 358/86 |
| 4,733,223 A | 3/1988 | Gilbert | 340/505 |
| 5,323,239 A | 6/1994 | Ward et al. | 348/607 |
| 5,473,361 A * | 12/1995 | Penny | 348/6 |
| 5,493,209 A | 2/1996 | Gumm et al. | 324/76.23 |
| 5,585,842 A | 12/1996 | Chappell et al. | 348/192 |
| 5,606,725 A | 2/1997 | Hart | 455/5.1 |
| 5,617,137 A | 4/1997 | Whitlow | 348/193 |
| 5,824,992 A * | 2/1999 | Caporizzo | 348/192 |
| 5,867,206 A | 2/1999 | Voght et al. | 348/6 |
| 5,881,363 A | 3/1999 | Ghosh et al. | 455/5.1 |
| 5,907,366 A | 5/1999 | Farmer et al. | 348/478 |
| 5,915,205 A | 6/1999 | Chen | 455/5.1 |

* cited by examiner

Primary Examiner—Victor R. Kostak
(74) Attorney, Agent, or Firm—Welsh & Katz, Ltd.; Eric D. Cohen

(57) ABSTRACT

Performance testing of transmission signals to ensure quality and compliance with governmental regulations by limiting interference with intended signals, such as entertainment signals seen by viewers, while reducing the manpower required for testing and eliminating the need for communication between field units and sources of transmission in order to improve traditional performance testing, for example, in Cable Television (CTV) Systems or CATV (Community Antenna TeleVision) Systems, which testing not only has been time consuming but also has required partial disruption of service, and application of these concepts to other modes of information transmission.

20 Claims, 7 Drawing Sheets

TRANSMITTING AND ENCODING

DETAIL OF SAMPLE GATE, 111, TEST SIGNAL FINDER, 112 AND LINE SELECTOR, 116

VERTICAL INTERVAL TEST SIGNAL INSERTION
TYPICAL

VERTICAL INTERVAL CARRIER INTERRUPTION
TYPICAL

TRANSMISSION PERFORMANCE TESTING

BACKGROUND OF THE INVENTION

This invention relates to performance testing of transmission systems, and more particularly, to the performance testing of CATV (Community Antenna TeleVision) systems.

In order to ensure quality viewing by CATV subscribers, frequent testing must be undertaken of television processing and transmission equipment. Traditionally the testing has included quantification of transmission impairments, such as carrier to noise ratio, amplitudes of distortion products and spurious signals, and the overall and channel frequency response of the system.

To prepare for prior testing, it has been necessary to rewire the transmission headend in order to properly introduce required test signals. Not only is this time consuming, but it also is expensive and a source of interference with the system users.

Measurements of test parameters often are made with a spectrum analyzer both at the headend and in the field. In order to measure television noise and underlying distortion products, the channel being tested is turned off so that the test parameters may be determined without interference.

This results in interruption of subscriber viewing and requires manual removal and restoration (turning off and on) of the selected channel at the headend.

Typically there are a number of test channels (4 to 20) that need to be addressed and several (6 or more) testing locations.

These operations are repeated many times, necessitating full attention at the headend for the duration of testing, generally a full day or more. In addition, communications from the field to the headend are required in order to synchronize switching and other operations. This usually is done by radio or telephone and results in delays from over crowded communication channels.

These procedures are laborious and labor intensive, often generating customer dissatisfaction because of frequent viewing interruptions.

Accordingly, it is an object of the invention to facilitate transmission testing. A related object is to facilitate transmission testing in community antenna television (CATV) systems.

Another object of the invention is to reduce the labor required in transmission testing, as well as achieve financial savings and the elimination of viewing interruptions.

Still a nother object of the invention is to promote customer satisfaction, particularly for television transmission.

A further object of the invention to provide for measurements of cable television system operating parameters with reduced manpower.

Yet another object is to allow testing without personnel at the headend and without the need for communications to and from the tester at the test points throughout a CATV system.

Still another object is to insert and use test signals without interference to the TV pictures viewed by subscribers.

A further object is to permit measurements of actual system noise and other underlying interference without interruption of subscriber viewing.

A still further object is to obviate the need for setup time and labor each time the system is to be tested.

Another object is to provide equipment, which in the event of equipment power supply failure, will not disrupt the functioning of a CATV system.

SUMMARY OF THE INVENTION

In accomplishing the foregoing and related objects, the invention provides a method and system for transmission testing by a permanent installation for the introduction of test signals. Required manpower for testing performance is greatly reduced and interference with customer viewing is virtually eliminated.

The apparatus of the invention includes a control unit installed in the headend and wired to the processing equipment of each test channel. This control unit includes equipment for the generation of required video test signals, a processor to automatically sequence the insertion of test signals and generate additional signals which cause certain other units to function properly. The panel of the control unit also has a display which assists in the setup of sequences and indicates current operating status.

In addition to the control unit, a switching unit is used in conjunction with the processing equipment employed on each test channel. These units work in concert with video insertion sequencing to turn off the radio frequency output of the channel for a short period while the measurement of the underlying signals is performed.

Turning off the test channel visual (or visual and aural) radio frequency carrier(s) allows measurement of underlying undesirable and interfering signals that interfere with subscriber viewing. From this perspective, the carrier desirably is removed only during non-informational or viewable time intervals, which, for television, is known as the "vertical interval" (usually lines 10–22 of both television fields). The "off" period produced by this switching is generally less than one television line, although modern TV receivers will tolerate "off" periods which remove several horizontal synchronizing pulses without any noticeable picture degradation. However, longer "off" periods can begin to be noticed as interruptions in the aural program.

Since the technique of the invention is employed to measure carrier to noise ratio (C/N), composite triple beat CTB), as well as composite second order (CSO) and spurious signal amplitudes, these impairments are collectively designated simply as "CTB", which are uniquely measured by sampling.

In order to complete the measurement process of the invention, a demodulator/decoder is used in conjunction with a spectrum analyzer (or other detection equipment) that executes measurements. The demodulator/decoder activates a switch in series with the measuring equipment only during the "off" periods of the test channel carrier to allow measurement of signals without test channel regular signal intrusion.

The invention provides for measurements of cable television system operating parameters with expenditure of reduced manpower by providing automatic sequencing of test signals and conditions to allow testing without personnel at the headend and without the need for communications to and from the tester at the test points throughout the CATV system.

Test signals are inserted and used within the television vertical interval to prevent interference with the TV pictures viewed by the subscribers, and measurements are made of actual system noise and other underlying interference without interruption of subscriber viewing.

The invention also develops a permanent headend installation that obviates the need for setup time and labor each time the system is to be tested, and headend equipment is provided which will not disrupt the functioning of the CATV system in the case of equipment power supply failure.

DETAILED DESCRIPTION

With reference to the drawings, FIG. 1A depicts an a transmission block diagram of an encoding and transmitting testing system in accordance with the invention, which is applied to CATV; while FIG. 1B represents reception from a CATV system, followed by decoding and measurement in accordance with the invention.

Control Unit and Encoding Switching Unit

Figure 2:
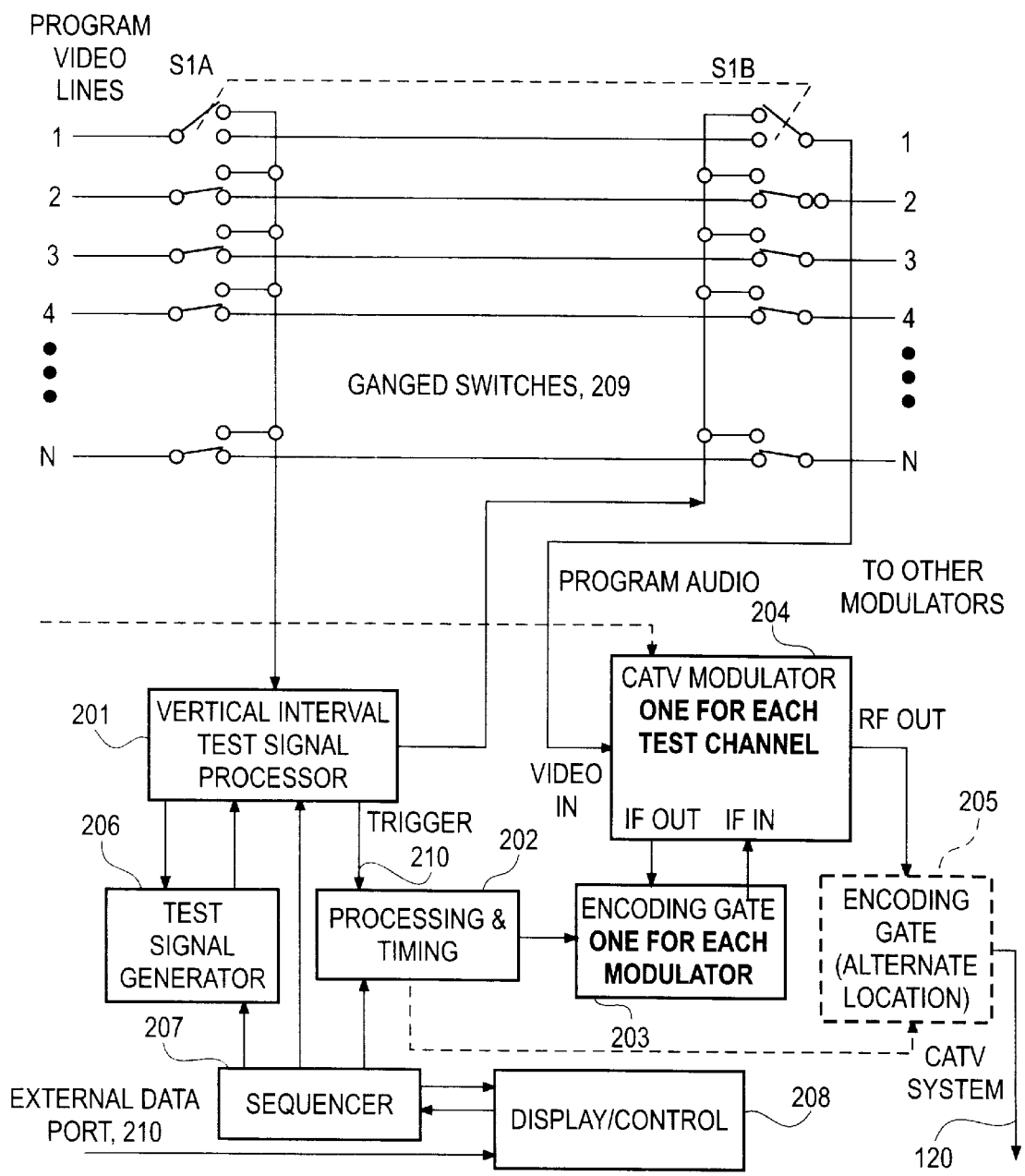
FIG. 2 is a detailed diagram of the control unit and encoding switching unit for the testing system of FIG. 1A.

With reference to FIG. 2, a Vertical Interval Test Signal Processor 201 is used to perform insertion. Channel selection and the test signal selection is achieved by a Sequencer 207, which commands Ganged Switches 209 to select the instant video channel to be tested and connects the appropriate video program line to a Modulator 204 of the selected channel through the Vertical Interval Test Signal Processor 201. The Sequencer 207 also commands a Test Signal Generator 206, which receives its timing from the Vertical Interval Test Signal Processor 201.

A combination of units 201 and 206 is available from Sencore, 3200 Sencore Dr., Sioux Falls, S.Dak. 57107. This unit is known as the "VIG791 CATV Video Insertion Generator", although the functions may be performed in specialized circuits designed for that purpose.

The video program material with the newly inserted test signals is directed to an appropriate CATV Modulator 104. This procedure is followed whenever it is desired to insert a test signal or to blank the carrier for CTB measurement.

In addition, for the CTB measurement, carrier blanking must be accomplished. There is one Encoder Gate 203 associated with each channel modulator. The preferable location for the Encoder Gate 203 is in only the visual intermediate frequency (IF) channel of the Modulator 204, although the combined visual/aural IF signal may also be switched. An alternate arrangement provides for this switching to be done at the RF output of the Modulator 204, as shown. Carrier blanking of the RF energy is implemented by sending a trigger from the Vertical Interval Test Signal Processor 201 to the Processing and Timing module 202, where a pulse is constructed with the proper width and delay to drive the Encoder Gate 203. This pulse gates the Modulator 204 at radio or intermediate frequency (RF or IF) depending on which location has been chosen for the Gate 203, with high attenuation preventing any significant signal to be transmitted during the duration of the pulse.

In cases where the attentuation of the available attenuator devices is insufficient to accomplish the desired reduction in output in the OFF state, a vertical interval test signal consisting of a 100 per cent white level coincident with the gating "off" period will further decrease the output level by an additional amount (approximately 18 dB).

Figure 4:
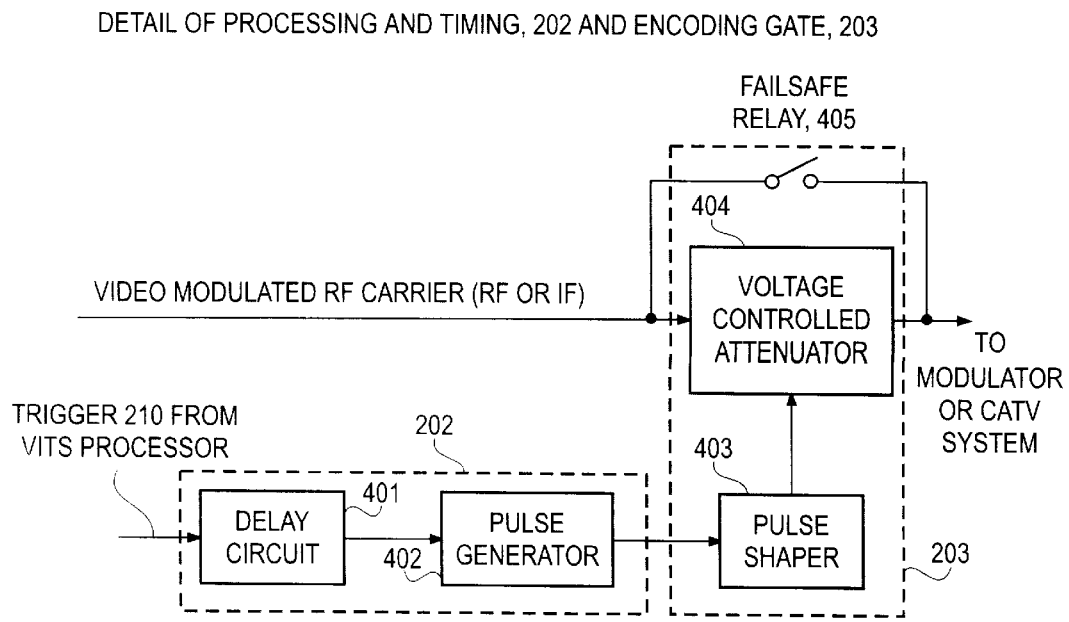
FIG. 4 is a diagram for test signal insertion in the TV vertical interval for the testing system of FIG. 1A.

The Processing and Timing module 202, further detailed in FIG. 4, must generate any Delay, by Unit 401, desired between the start of the selected line and the beginning of the generated pulse. It also establishes the pulse width in Pulse Generator 402, and controls both the rise and fall times in a Pulse Shaper 403. The rise and fall times can be in the vicinity of 0.5 microsecond to contain the pulse energy within the 6 MHz TV channel, while reaching full attenuation of the signal quickly. These functions may all be accomplished by either analog or digital processes.

A simple analog configuration employs a combination of one-shot multivibrator circuits to generate delay and pulse width, using, for example, a National Semiconductor part number 74HC4538. Simple resistor/inductor/capacitor circuits may be used to control the rise and fall times.

A Voltage Controlled Attenuator 404 is capable of gradually changing the attenuation in response to the shaped waveform from the Pulse Shaper 403 in order to avoid too rapid switching which could cause switching energy to exist outside of the channel being tested, and hence cause interference with other TV channels. Voltage controlled attenuators similar to model AT-336 manufactured by M/A-COM, Waltham, Mass., are suitable and may be used with two or more in series to provide adequate attenuation.

The Voltage Controlled Attenuator may also include a series RF amplifier to make up for the losses in the attenuator components. In addition, a shunt Relay 405 can be applied across the attenuator unit and configured to close if the unit power should fail and thereby assure "fail safe" operation of the system.

Alternately, an attenuator may be placed in series with the Fail Safe Relay 405 to produce a loss equal to the ON state loss of the Voltage Controlled Attenuator 404.

The removal period of RF energy in the television signal is of a duration that may vary from a fraction of a TV line to many consecutive or scattered lines. Since this period is relatively short in terms of the synchronization time constants of television receivers, the effect does not disturb the viewed TV picture as long as these intervals are within the vertical interval (not viewable) of the TV format. Since the visual carrier is absent during these periods small perturbations of the sound are present on some (usually older) TV receivers. As a result of employment of this technique it is not necessary to interrupt subscriber viewing during the testing period.

Figure 5:
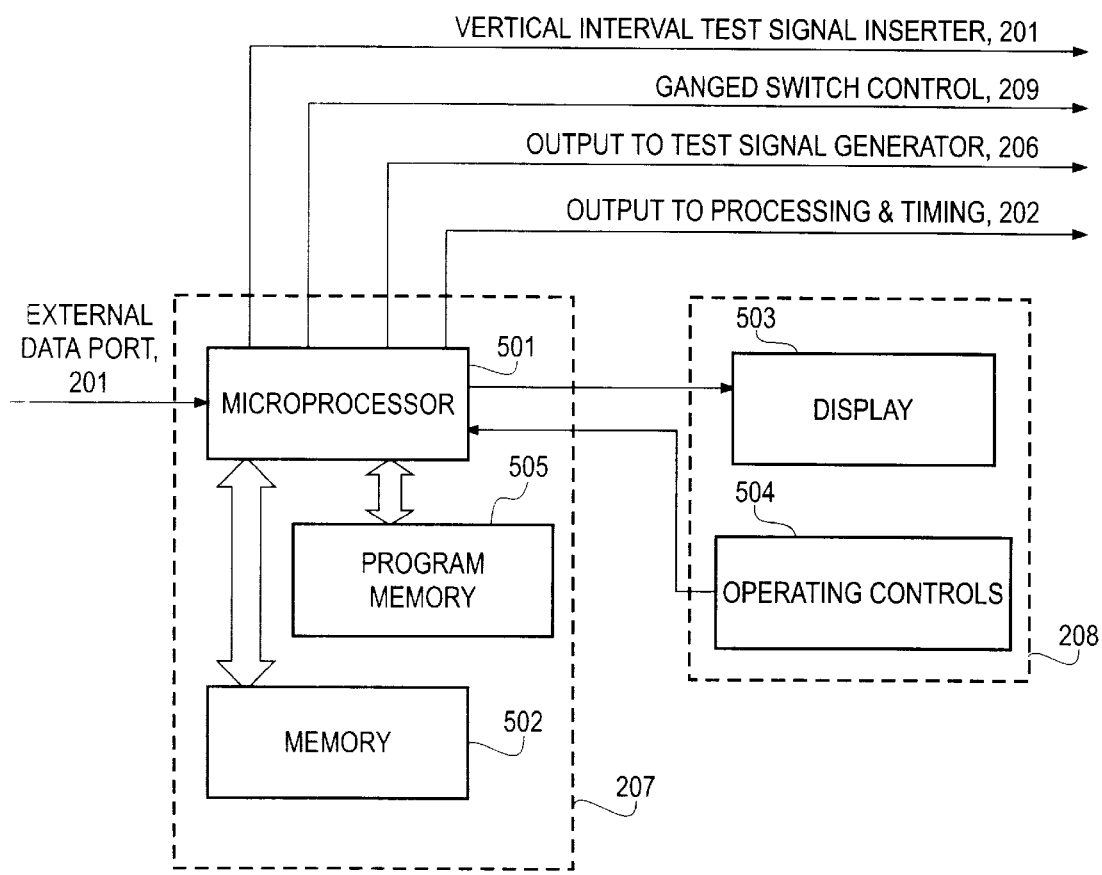
FIG. 5 is a diagram for vertical interval carrier interruption for CTB measurements for the testing system of FIG. 1A.
Figure 6:
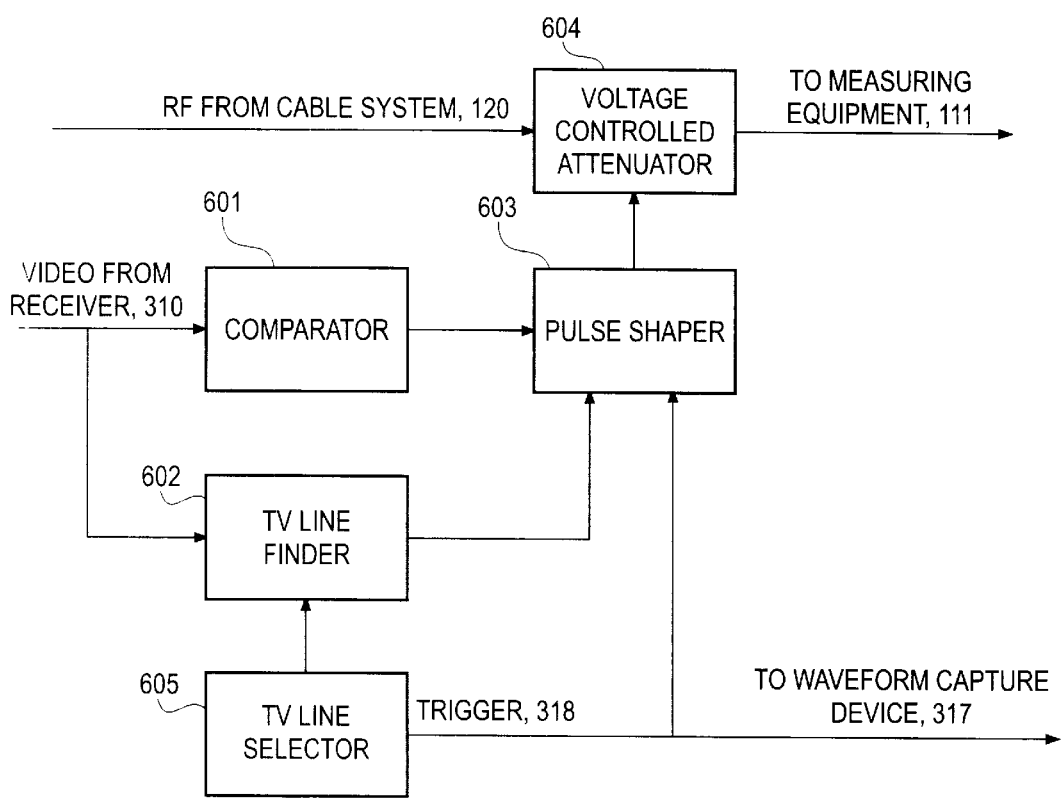
FIG. 6 details the Sample Gate, the Test Signal Finder, and the Line Selector for the testing system of FIG. 1B.

FIG. 5 details the Sequencer 207 of FIG. 2, and the Units 503 and 504 of the Control and Display block 208 in FIG. 2. The Control and Display unit 503–504 has provision for setting and indicating the following parameters:

Power—ON/OFF

Test Channel Selection

Test Pattern Selection

Sequence Timing

Test start and stop times

Time of day, dates and

Other desirable system configuration and status information

Besides configuring the above from front panel Operating Controls at Unit 503, the control functions may be externally manipulated through an External Data Port 210.

The Sequencer 207 of FIG. 2, has at its heart a Microprocessor 501, with read/write Memory 502, and Program Memory 505. The stored program in Memory 505 directs the operation of the unit in a prearranged manner and may be changed as required for revisions and upgrades. The Sequencer 207 commands the Ganged Switches 209 of FIG. 2, the Test Signal Generator 206, the Vertical Interval Signal Inserter 201, and the Processing and Timing module 202 in order to achieve the desired functionality.

As a result of the automatic sequencing of the test signals no personnel are required at the headend and no communication is needed between the headend and the field test points to synchronize the signals with the field measurements.

Figure 1:
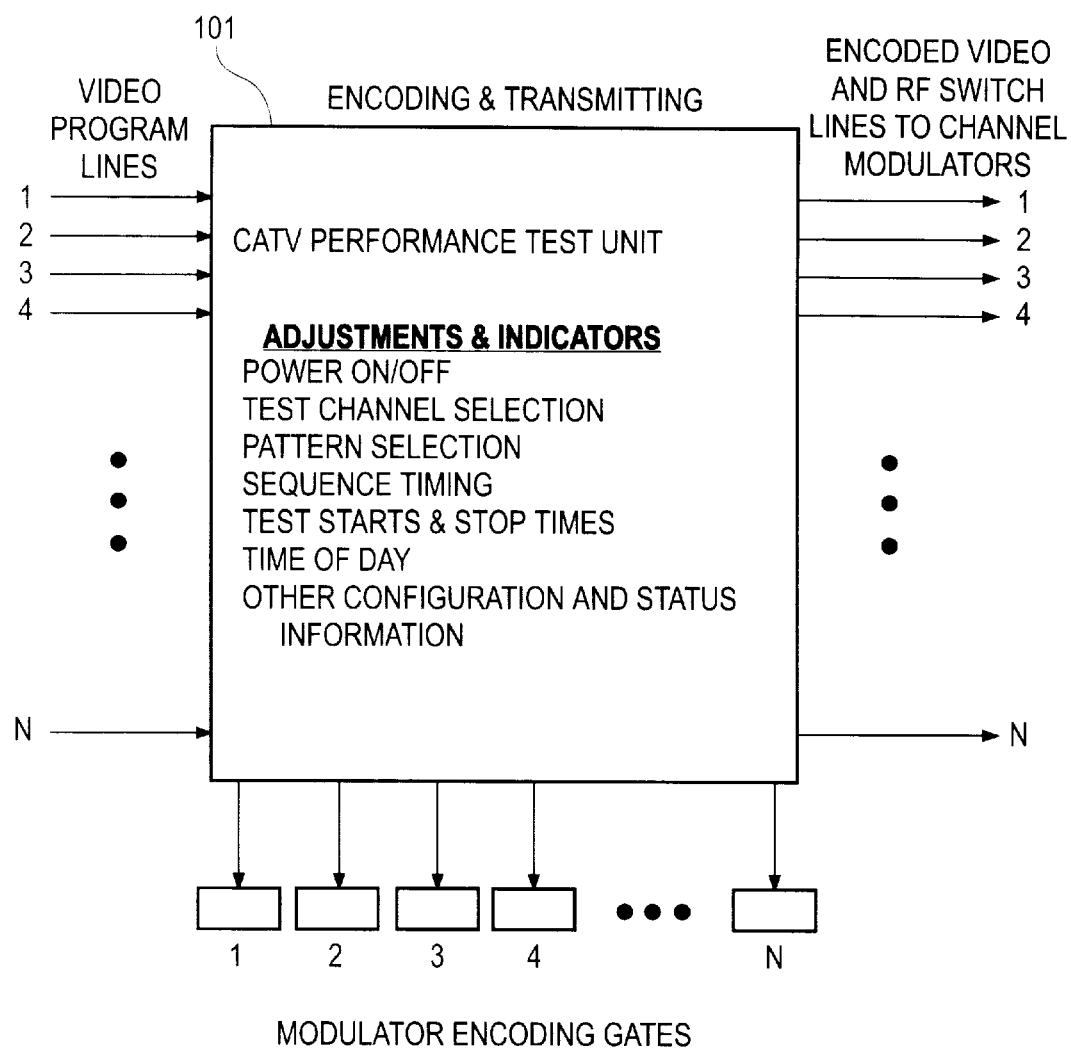
FIG. 1A is a block diagram of an encoding and transmitting testing system in accordance with the invention.
FIG. 1B is a block diagram of a receiving, decoding and measurement testing system in accordance with the invention.
Figure 3:
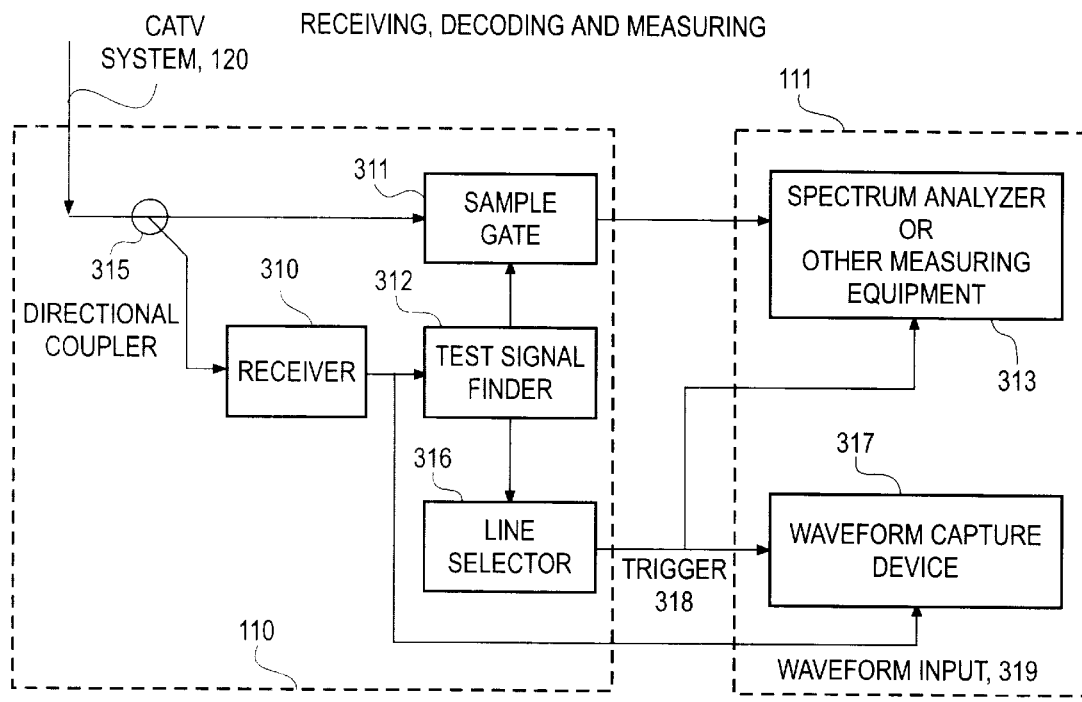
FIG. 3 is a block diagram of the demodulator/decoder for the testing system of FIG. 1B.

With reference to FIGS. 1, 2 and 3, the RF carriers produced and modulated in the CATV Modulator(s) 204 are transmitted to subscribers over the cable TV network 120. At the location where a test is desired to be performed, a small portion of the signal is introduced into the Decoding Device 110, where signal is extracted with a directional coupler 315, and the fed to a Receiver 310, which can be a model RFSO7US3 CATV tuner/demodulator manufactured by Sharp Microelectronics, Camas, Wash.

The Receiver 310 demodulates the test channel and passes the baseband video signal to the Test Signal Finder 312. Test Signal Finder 312 locates the test signal within the vertical interval. This is accomplished either by sensing the reduction of the carrier energy to nearly zero amplitude, or by selecting the appropriate, prearranged TV line using the Line Selector 316. Sensing the reduction in amplitude may be achieved by a comparator, such type LM319 of National Semiconductor, Santa Clara, Calif., which is set to sense signals approaching zero amplitude.

Selection of a prescribed TV line may be accomplished by a device similar to the Sencore VIG791 previously identified. In either case a pulse is generated which is coincident with the period during which the carrier has been interrupted. This signal is then applied to the Sample Gate 311, which is turned ON during the period that the visual carrier is OFF. In this way noise and spurious signals which are normally obscured by the TV signal are readily detectable and measurable.

The circuitry to accomplish this is similar to blocks 202 and 203, which are further described in FIG. 4, with the exception that the Voltage Controlled Attenuator 404, whose normal state is OFF is turned ON during the sampling period.

The Spectrum Analyzer 313 is of standard RF test equipment and is normally the instrument of choice to make these observations. However, any equipment capable of sensing the interfering signals may be employed.

Since the ON time for the sample gate is on the order of 0.1% of the transmission time, the analyzer is swept slowly over the frequency range of interest, and the peak values of the response are retained. The setup parameters of the measuring equipment are in accordance with good engineering practice, such as those described in, but not limited to, "NCTA Recommended Practices for Measurements on Cable Television Systems". Appropriate corrections of the indicated data are made to account for the sampling process and the measurement of noise-like signals.

In addition to the above measurement procedure to observe carrier to noise, composite third and second order interfering products and other spurious signals in the band of interest, other test signals in the vertical interval may also be observed without removal of the visual carrier.

This is accomplished by Configuring Encoding Gate 203 to allow the RF signal to flow at all times and employing the TV Line Selector 316 to trigger the Spectrum Analyzer 313 in order to capture the test signal previously inserted by the Inserter 201. In this case the spectrum analyzer is set on "zero span" and the sweep adjusted to cross the screen in about one TV line duration (approximately 63 microseconds) each time a trigger is received from Line Selector 316.

Due to adjacent channel and different spectrum analyzer parameters, this procedure must be tailored for the specific equipment employed. Another technique is to use a receiver similar to 310 followed by a video Waveform Capture Device 317 to capture the waveform 319, illustratively a computer fitted with a GageScope Lite high speed capture board, such as that manufactured by Gage Applied Sciences, 5465 Vanden Abeele, Montreal, Quebec, Canada H4S 1S1, to record these data.

The measurement of in-band-flatness verifies that the transmission equipment in the system does not excessively distort the amplitude of the video information being transmitted. This test may be made in a unique manner employing what is known as the "line sweep" signal (provided by the Sencore VID791, or equivalent). The signal is normally inserted in one line of the vertical interval (one or both fields). It is comprised of a sine wave signal, which nominally sweeps linearly from about 500 KHz to about 5 MHz over the active period of one TV line. This signal is carried at full amplitude and therefore is not overwhelmed by any component of the TV picture. Allowing the Specturm Analyzer 113 to sweep slowly across the RF channel frequencies and retain the maximum amplitude response will result in a display of the amplitude response over the band of video frequencies in the "line sweep" and hence display the "in-band-flatness" of the channel.

In order to introduce a television picture and its associated sound to a CATV system, visual and aural information are modulated on a radio frequency (RF) carrier.

Modulators are supplied by numerous manufacturers, including the General Instrument and Scientific Atlanta of Atlanta, Ga.

Signals for proof-of-performance testing are embedded in the visual program, while the aural program goes directly to the modulator.

Figure 7:
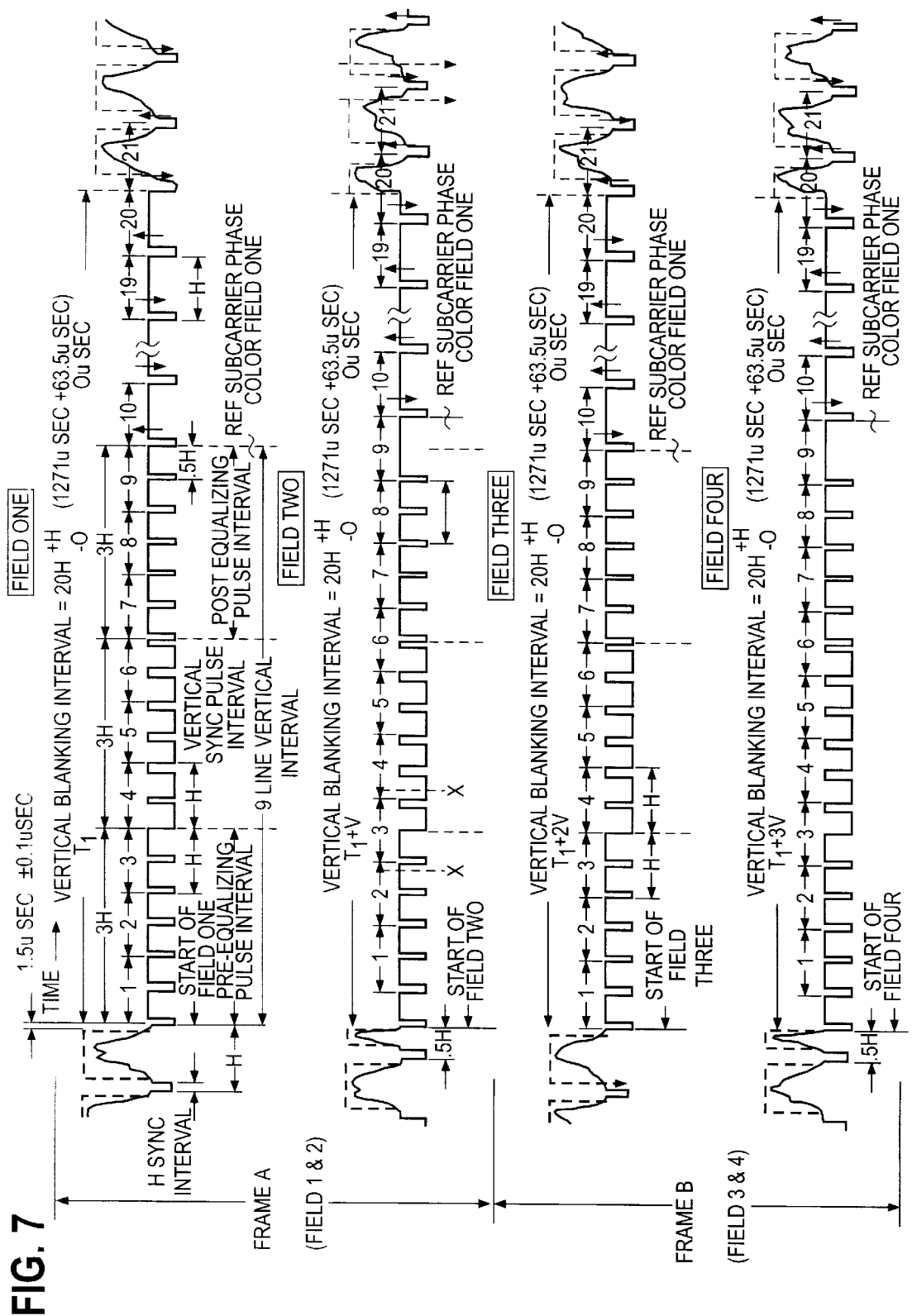
FIG. 7 is a diagram of the FCC NTSC field video format.
Figure 8:
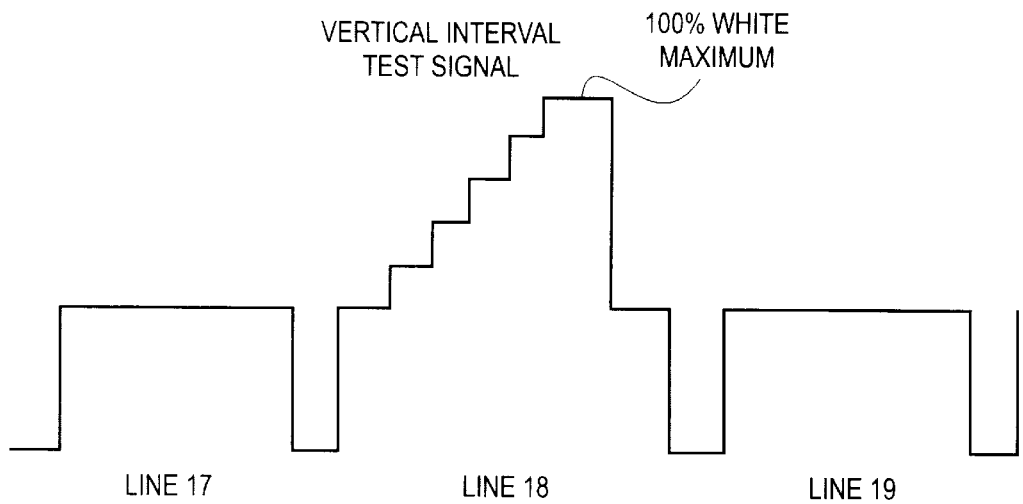
FIG. 8 is a diagram of the first 22 lines of a single NTSC TV field with typical test signal insertion in the vertical interval for testing the system of FIG. 1B.
Figure 9:
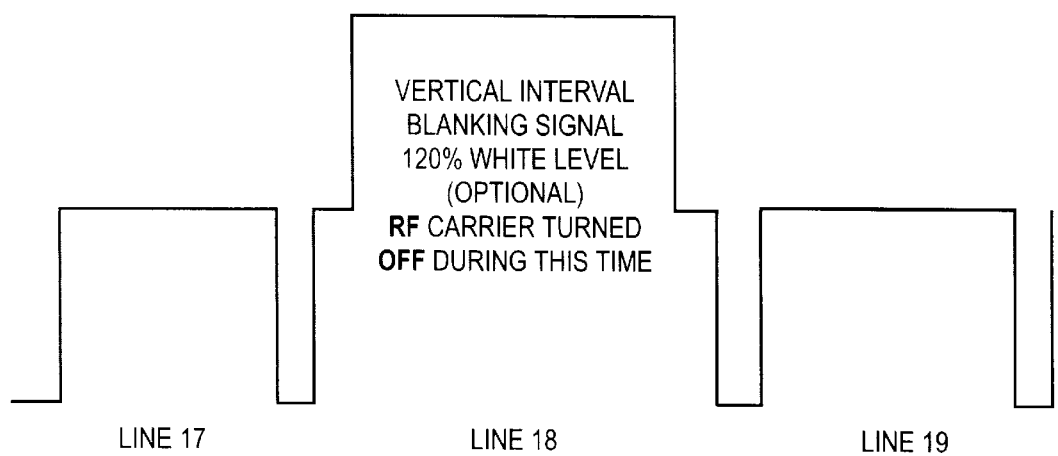
FIG. 9 is a timing diagram of vertical interval carrier interruption for CTB measurements in the testing system of FIG. 1B.

NTSC ("National Television System Committee") visual signals are made up of lines, which sweep horizontally across the picture tube, and fields, which are lines of the picture scanned within one vertical segment. A complete picture is formed by a frame which is the combination of two fields that complete the interlaced scan of the complete picture. A color burst signal alternates in phase over a span of two consecutive frames. The parameters for these signals are described and defined in detail in the US Government Regulations of 47CFR (Code of Federal Regulations) as illustrated in FIG. 7.

This invention applies not only to US NTSC television standard, but also is equally applicable to other internationally accepted television formats with appropriate modifications.

At the beginning of each television field there are lines (20 lines in NTSC) which are not viewed by the receiving set.

The beginning 9 lines produce the vertical synchronization signals. This entire region is known as the Vertical Blanking Interval (VBI).

In addition to signals for vertical picture synchronization, one or more test signals may also be inserted in the remaining lines of the VBI by the broadcaster or at the CATV headend to measure the quality of cable system transmission, or carry information in addition to the TV picture.

The employment of the gated measurement technique of this invention for use in television transmission has been described in detail above. However, the same technique of interruption of transmission, for relatively short time periods, can be applied to any type of analog and/or digital transmission. It usually is important to assess the nature and magnitude of the interfering signals in the transmission channel in order to establish and maintain optimum transmission performance. This technique allows measurement of the required parameters without removal of the channel and inhibiting the flow of information. The only additional system requirement is the ability to absorb these short interruptions without contamination of the information contained in the transmission. An example of this employment is interruption of a digital data stream in a system which employs one or more error-correcting features. In such a system the error correction has the ability to reconstruct lost information with certain length and distribution limits. Operation within these limits will define allowable interruption parameters for implementation of the gating technique.

It will be appreciated that the foregoing detailed description is illustrative only, and that modifications which do not depart from the spirit and scope of the invention may be made by those of ordinary skill in the art.

What is claimed:

1. An apparatus for testing the performance of a CATV transmission system having a headend, a plurality of RF channels, and a plurality of downstream nodes, said downstream nodes receiving program material encoded in radio frequency (RF) signals from the headend on the plurality of RF channels, the apparatus comprising:
    a control unit operatively coupled to the headend of the CATV transmission system;
    a measurement device operatively connected to at least one downstream node to measure predetermined parameters of the CATV transmission system on at least one predetermined RF channel; and
    wherein the control unit suppresses generation of an RF carrier signal on the predetermined RF channel during a portion of a vertical retrace interval to facilitate measurement of the predetermined parameters by the measurement device, said suppression of the RF carrier signal during the portion of the vertical retrace interval causing no disruption of the program material on the predetermined RF channel as viewed by a subscriber.

2. The apparatus of claim 1 wherein the control unit is permanently installed in the headend of the CATV transmission system.

3. The apparatus of claim 1 wherein suppression of the RF carrier signal facilitates performing predetermined tests of the CATV transmission system, the predetermined tests selected from the group consisting of composite triple beat test, composite second order test, spurious signal amplitude test and carrier-to-noise ratio test.

4. The apparatus of claim 1 wherein the suppression of the RF carrier signal permits measuring of predetermined parameters of the CATV transmission system, said predetermined parameters being obscured by the presence of the RF carrier during said measuring.

5. The apparatus of claim 1 further including a vertical interval processor configured to receive CATV synchronization signals from the headend corresponding to the predetermined RF channel, and generate a trigger signal to cause suppression of the RF carrier signal during the vertical retrace interval.

6. The apparatus of claim 1 wherein the program material provided to the subscriber is uninterrupted by suppression of the RF carrier signal because no program material is provided to the subscriber during the vertical retrace interval.

7. The apparatus of claim 1 wherein the control unit further includes an attenuation circuit that suppresses the amplitude of the RF carrier signal.

8. The apparatus of claim 7 wherein if the attenuation circuit does not provide sufficient attenuation of the RF carrier signal, a test signal having a one-hundred percent white level is inserted during the vertical blanking interval to further attenuate the amplitude of the RF carrier signal.

9. The apparatus of claim 7 wherein the amplitude attenuation is performed according to a predetermined waveform so as to eliminate or reduce generation of spurious RF signals.

10. The apparatus of claim 7 wherein the control unit further includes a pulse shaping circuit operatively coupled to the attenuation circuit, the pulse shaping circuit configured to facilitate attenuation of the RF carrier signal according to a predetermined attenuation rise time and an attenuation fall time.

11. The apparatus of claim 7 wherein the control unit further includes a timing circuit operatively coupled to the attenuation circuit, the timing circuit configured to facilitate attenuation of the RF carrier signal over a predetermined period of time and in a timed relationship to the vertical blanking interval.

12. The apparatus of claim 7 wherein the attenuation circuit is a voltage-controlled attenuator.

13. The apparatus of claim 7 wherein the amplitude of the RF carrier signal is suppressed at an intermediate frequency (IF) stage.

14. The apparatus of claim 7 wherein the amplitude of the RF carrier signal is suppressed at an RF output state.

15. The apparatus of claim 1 wherein the control unit further controls selected test parameters, said selected test parameters selected from the group consisting of RF channel selection under test, test start time, test end time, date of test and test pattern selection.

16. The apparatus of claim 15 wherein the control unit automatically controls execution of the selected test parameters so that a human operator in not required at the headend to facilitate testing of the CATV transmission system.

17. The apparatus of claim 1 wherein the measurement device is a spectrum analyzer.

18. The apparatus of claim 1 wherein the measurement device demodulates the predetermined RF channel to determine the time of the vertical retrace interval, and during the vertical retrace interval, captures data corresponding to predetermined parameters of the CATV transmission system.

19. A method for testing the performance of a CATV transmission system having a headend, a plurality of RF channels, and a plurality of downstream nodes, said downstream nodes receiving program material encoded in radio frequency (RF) signals from the headend on the plurality of RF channels, the method comprising the steps of:
    operatively coupling a control unit to the headend of the CATV transmission system;
    operatively connecting a measurement device to at least one downstream node;

suppressing generation of an RF carrier signal by the control unit on a predetermined RF channel during a portion of a vertical retrace interval;

tuning the measuring device to a center frequency of a picture carrier of the predetermined RF channel; and measuring predetermined parameters of the CATV transmission system by the measuring device on the predetermined RF channel, wherein suppression of the RF carrier signal during the portion of the vertical retrace interval causes no disruption of the program material on the predetermined RE channel as viewed by a subscriber.

20. An apparatus for testing the performance of a CATV transmission system having a headend, a plurality of RF channels, and a plurality of downstream nodes, said downstream nodes receiving program material encoded in radio frequency (RF) signals from the headend on the plurality of RF channels, the apparatus comprising:

a control unit operatively coupled to the headend of the CATV transmission system;

a measurement device operatively connected to at least one downstream node to measure predetermined parameters of the CATV transmission system on at least one predetermined RF channel;

means for suppressing generation of an RF carrier signal on the predetermined RF channel during a portion of a vertical retrace interval;

said means for suppressing generation of the RF carrier signal facilitating measurement of the predetermined parameters by the measurement device; and said suppression of the RF carrier signal during the portion of the vertical retrace interval causing no disruption of the program material on the predetermined RF channel as viewed by a subscriber.

* * * * *